(12) United States Patent
van Dijk et al.

(10) Patent No.: US 10,103,630 B1
(45) Date of Patent: Oct. 16, 2018

(54) SMPS FILTER OPTIMIZATION

(71) Applicant: NXP B.V., Eindhoven (NL)

(72) Inventors: Lucas Pieter Lodewijk van Dijk, Nijmegen (NL); Martin Wagner, Hamburg (DE); Gert van der Horn, Delft (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/896,850

(22) Filed: Feb. 14, 2018

(51) Int. Cl.
*H02M 3/158* (2006.01)
*H02M 3/156* (2006.01)
*H02M 3/157* (2006.01)

(52) U.S. Cl.
CPC ............ *H02M 3/158* (2013.01); *H02M 3/156* (2013.01); *H02M 3/157* (2013.01); *H02M 3/1563* (2013.01); *H02M 3/1582* (2013.01); *H02M 3/1584* (2013.01); *H02M 3/1588* (2013.01)

(58) Field of Classification Search
CPC ........................................ H02M 3/156–3/1588
See application file for complete search history.

(56) References Cited

U.S. PATENT DOCUMENTS

| 5,418,704 | A | 5/1995 | Hua et al. | |
|---|---|---|---|---|
| 5,736,842 | A | 4/1998 | Jovanovic | |
| 5,923,153 | A | 7/1999 | Liu | |
| 9,413,240 | B2* | 8/2016 | Mansri | H02M 3/158 |
| 9,979,312 | B2* | 5/2018 | Stewart | H02M 5/293 |
| 2006/0006850 | A1* | 1/2006 | Inoue | H02J 7/0065 |
| | | | | 323/265 |
| 2016/0357242 | A1* | 12/2016 | Ihs | G06F 1/324 |

* cited by examiner

*Primary Examiner* — Gary L Laxton
*Assistant Examiner* — Rafael O De Leon Domenech
(74) *Attorney, Agent, or Firm* — Rajeev Madnawat

(57) ABSTRACT

A power supply is disclosed. The power supply an output diode, a main switch coupled to the input filter and an output inductor coupled to the output diode and the main switch. The power supply also includes a bypass switch coupled to the main switch and configured to bypass the output inductor. A switch driver is included and the switch driver is configured to turn on the bypass switch and upon detecting the output diode in a blocking mode, turn on the main switch and turn off the bypass switch.

14 Claims, 4 Drawing Sheets

SMPS FILTER OPTIMIZATION

BACKGROUND

Power supplies are used virtually in every electronic device primarily for converting alternate current (AC) or direct current (DC) electrical input that may vary in voltage due to power line conditions and load factors, into a constant direct current (DC) output voltage to power the internal circuitry of the electronic device.

Power supplies designed to convert a fluctuating input voltage to a constant, lower, output voltage can be realized by a linear converter. However, such linear power supplies are characterized by poor efficiency. If a linear power supply is used for delivering larger output current or power, the efficiency becomes detrimentally prominent.

A switched mode power supply (SMPS) is often used when a greater efficiency is desired. However, SMPSs use switching mechanism internally using switches and such internal switching is known to cause electromagnetic emission (or EMC noise). The SMPS typically includes an asynchronous converter that may also include one or more diodes. Reverse recovery characteristics of a diode is typically a cause of the production of the EMC noise.

To reduce the EMC noise, typically, an input filter is used. For certain types of applications, such as electronic systems used in automobiles, there may be regulatory requirements to keep the EMC noise below a preset threshold. The input filter is designed to keep the EMC noise below this threshold. In addition, the diode may also need to have superior reverse recovery characteristics that may need bigger space on a silicon wafer. Reducing the size of the input filter and possibly also the size of the diode may reduce the overall size and cost of a power supply.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a power supply is disclosed. The power supply may include an input filter, an output diode, a main switch coupled to the input filter and an output inductor coupled to the output diode and the main switch. The power supply also includes a bypass switch coupled to the main switch and configured to bypass the output inductor. A switch driver is included and the switch driver is configured to turn on the bypass switch and upon detecting the output diode in a blocking mode, turn on the main switch and turn off the bypass switch. In some other examples, the bypass switch is configured to be turned off automatically when the main switch turns on.

In another embodiment, a method for reducing a current spike in a switch mode power supply is disclosed. The method includes turning on a bypass switch, detecting if a diode coupled to an output stage of the switch mode power supply is in a blocking mode and upon detecting that the diode is in the blocking mode, turning on a main switch of the power supply and turning off the bypass switch.

In some examples, the input filter includes a filter inductor and a filter capacitor and the power supply further includes a reference voltage source to regulate an output voltage, an oscillator, a control loop and a feedback element. In some embodiments, the main switch, the bypass switch and the switch driver are incorporated in a same integrated circuit.

The power supply may also include a comparator coupled to the bypass switch and the switch driver. The comparator is configured to detect if the output diode is in the blocking mode and if the output diode is in the blocking mode, the comparator provides a signal to the switch driver. Upon receiving the signal, the switch driver turns on the main switch and turns off the bypass switch.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in detail in the description so as not to obfuscate the present disclosure.

The current in a forward-biased junction diode is made up of majority carriers and minority carriers. When there is a forward current, there are free minority carriers. A forward conducting diode whose forward current has been reduced to zero, continues to conduct for a brief period of time due to minority carriers stored in the pn-junction and carriers stored in the bulk semiconductor material.

The forward current in a diode goes to zero if the diode state changes from forward biased to reverse biased. According to the characteristics of a diode, ignoring the leakage current, when the diode is reverse biased there should be no reverse current if the reverse voltage does not exceed the breakdown voltage. However, in practice, diodes do exhibit a reverse characteristic for a brief period of time due to the free carriers as described above. These minority carriers require some finite time, e.g., the reverse recovery time, to recombine with opposite charges in order to be neutralized. This brief period of time is called the reverse recovery time of a diode.

Ideally, diodes should have a zero reverse recovery time. However, the manufacturing cost is higher thus making the overall system (e.g., SMPS) expensive. Embodiments described herein do not require a special type of diode having excellent reverse recovery time, thus making the overall system less expensive. In addition, a smaller input filter (e.g., with lower L, C values) may be used. A smaller filter would make the overall size of the SMPS smaller and cheaper.

Figure 1:
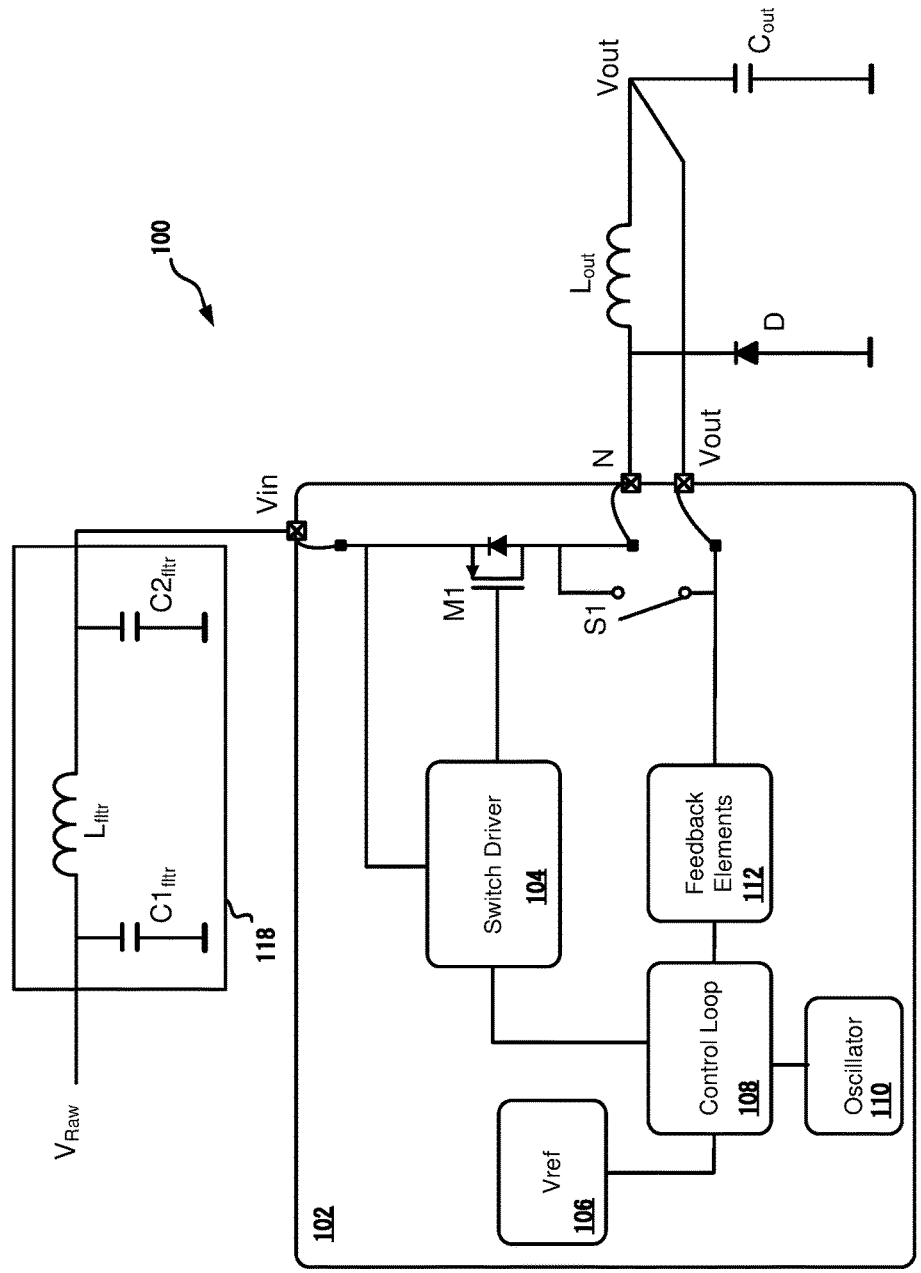
FIG. 1 depicts a schematic diagram of a power supply with a bypass switch in accordance with one or more embodiments of the present disclosure.

FIG. 1 depicts a schematic diagram of a power supply 100 with a bypass switch S1. The power supply 100 includes an input filter 118 that may include one or more capacitors $C1_{fltr}$, $C2_{fltr}$ and an inductor $L_{fltr}$. The power supply 100 also includes a control chip 102, an output inductor $L_{out}$, a diode D and an output capacitor $C_{out}$. It should be noted that in some embodiments the diode D may be incorporated inside the control chip 102. The control chip 102 includes pins N, $V_{out}$, $V_{Raw}$ and GND. The control chip 102 may also include a switch driver 104, a feedback element 112, a control loop 108, an oscillator 110 and a voltage reference source ($V_{ref}$) 106.

The control chip 102 includes a reference voltage source 106. The reference voltage source 106 generates a voltage that is used for regulating the output voltage $V_{out}$. An oscillator 110 is included to generate an output voltage wave that is fluctuating in amplitude according to an oscillation frequency. In some examples, the oscillator 110 may be of type RC-oscillator or relaxation oscillator. A feedback element 112 is included. In some examples, the feedback element 112 may be outside the control chip 102. The feedback element 112 divides a nominal output voltage by the reference voltage generated by the reference voltage source 106. A control loop 108 is included to adjust the turn-on time of the switch M1 such that the actual output voltage equals the nominal output voltage even when the input voltage and/or the load current is fluctuating. In some examples, the control loop 108 may be implemented using well known stabilization methods such as "voltage mode control" or "current mode control." A switch driver 104 is included to provide sufficient switching voltage to turn the switch M1 on/off and also to control the timing of turning the switch M1 on/off. In some examples, the switch driver 104 may include a level shifter with a clamp circuit.

Figure 2:
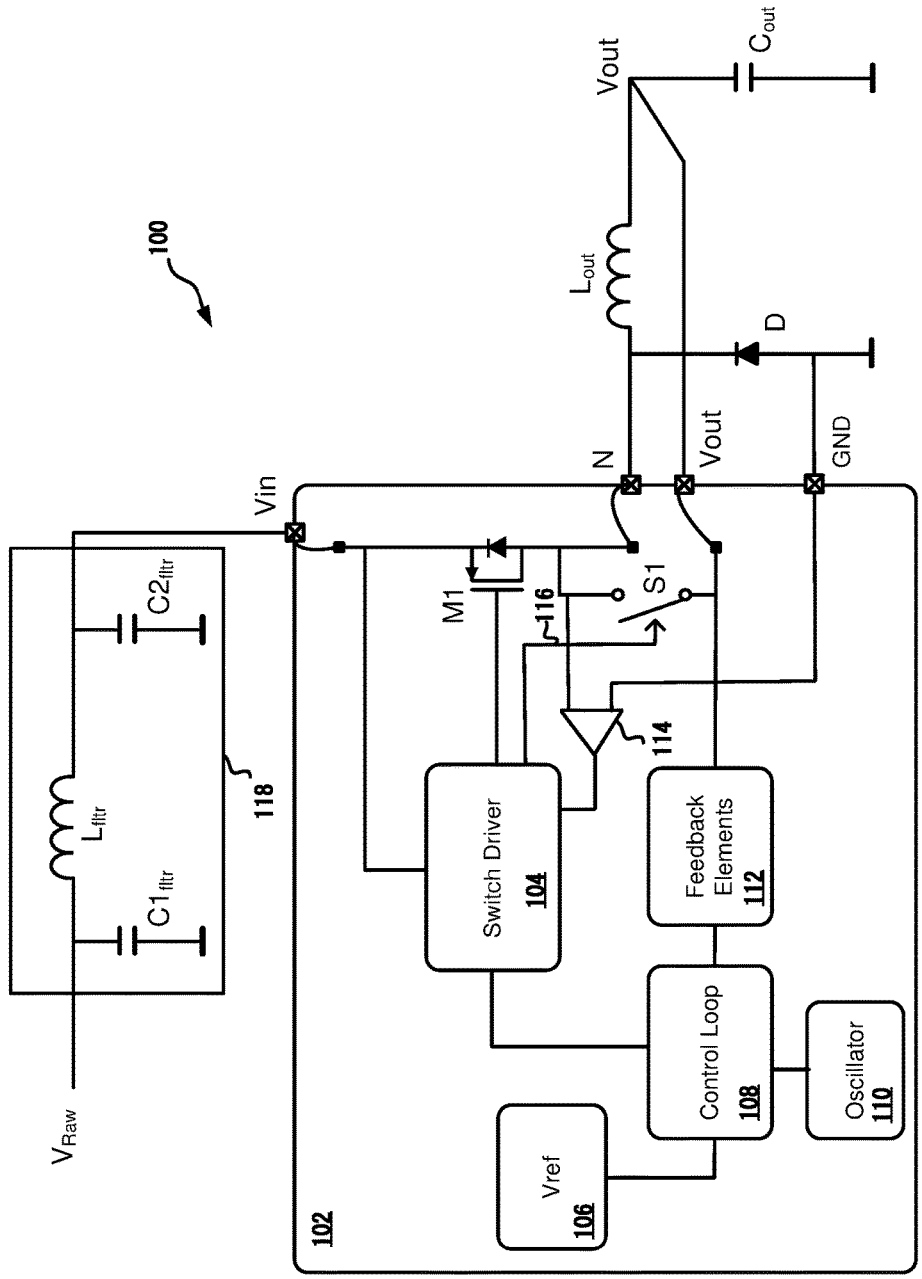
FIG. 2 depicts a schematic of the power supply in accordance with one or more embodiments of the present disclosure.

FIG. 2 depicts the control chip 102 in more details. As shown, a comparator 114 is coupled to the switch driver 104 and the switch driver 104 is also coupled to the bypass switch S1. In each turning on/off cycle, the bypass switch S1 is turned on first while the switch M1 is still off. When the bypass switch S1 is turned on, the diode D goes from the conduction state to blocking state and the reverse recovery charge of the diode D is conducted from the output capacitor $C_{out}$. As soon as the reverse state of the diode D is detected by the comparator 114, the switch driver 104 turns on the switch M1 and turns off the bypass switch S1. In some examples, the bypass switch S1 is automatically turned off when the main switch M1 is turned on. The automatic turn-off of the bypass switch S1 can be realized, for example using an NMOS transistors with its gate switched to $V_{out}$.

Figure 3:
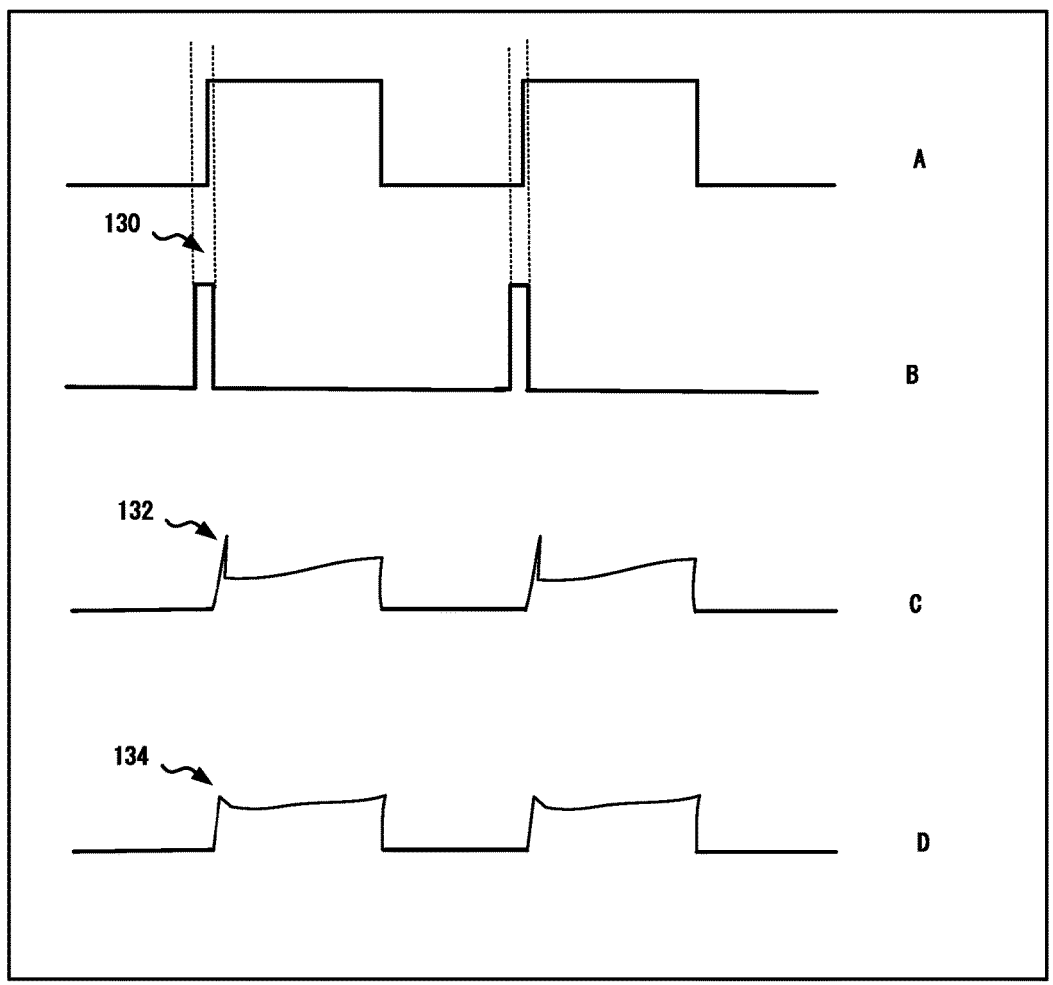
FIG. 3 depicts a switching pulse and current curves in accordance with one or more embodiments of the present disclosure.

FIG. 3 depicts switching pulses and current curves. Graph A shows a switching pulse for the switch M1 and Graph B shows the switching pulse for the bypass switch S1. As depicted, the bypass switch S1 is turned on prior to the switch M1. The switching time difference 130 is automatically adjusted based on the reverse recovery time of the diode D. Therefore, the reverse recovery time of the diode D becomes less important. Graph C shows the input current curve and as shows, the curve includes a spike 132 in current due to the reverse recovery characteristics of the diode D. Graph C is based on when there is no bypass switch S1 in the circuit (shown for comparison purposes). Graph D shows the input current curve when the bypass switch S1 is incorporated and switched according to Graph B. As shown, the spike 134 in the current is reduced substantially, thereby causing less EMC interference.

Figure 4:
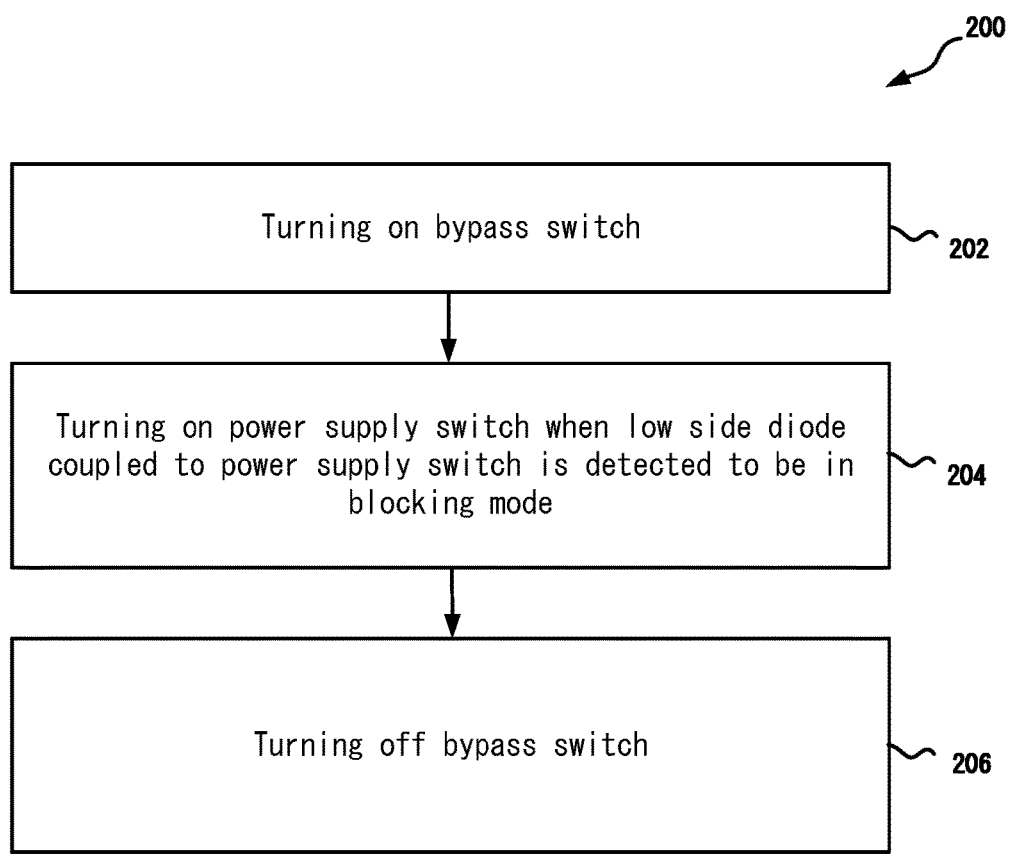
FIG. 4 illustrates a method for reducing current spike in switch mode power supplies in accordance with one or more embodiments of the present disclosure.

FIG. 4 illustrates a method 200 for reducing current spikes in a switch mode power supply 100. Accordingly, at step 202, the bypass switch S1 is turned on. At step 204, the switch M1 is turned on when the diode D is detected to be in the blocking mode by the comparator 114. At step 206, the bypass switch S1 is turned off.

As described above, using the bypass switch S1 reduces the dependence on high quality and high value filter components incorporated in the filter 118. Further the diode D is also not required to have a good reverse recovery characteristics. Thus, a cheaper diode may be used.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A power supply, the power supply comprising:
an output diode;
a main switch coupled to an input filter;
an output inductor coupled to the output diode and the main switch;
a bypass switch coupled to the main switch and configured to bypass the output inductor; and
a switch driver configured to turn on the bypass switch, wherein the turning on of the bypass switch causes the output diode to transition into a blocking mode, and upon detecting the output diode in the blocking mode, turn on the main switch and turn off the bypass switch.

2. The power supply of claim 1, wherein the input filter includes a filter inductor and a filter capacitor.

3. The power supply of claim 1, further including a reference voltage source to regulate an output voltage.

4. The power supply of claim 1, wherein the main switch, the bypass switch and the switch driver are incorporated in a same integrated circuit.

5. The power supply of claim 1, further including a comparator coupled to the bypass switch and the switch driver.

6. The power supply of claim 5, wherein the comparator is configured to detect if the output diode is in the blocking mode and if the output diode is in the blocking mode, the comparator provides a signal to the switch driver.

7. The power supply of claim 6, wherein upon receiving the signal, the switch driver turns on the main switch and turns off the bypass switch.

8. The power supply of claim 1, further including an oscillator, a control loop and a feedback element.

9. A method for reducing a current spike in input current of a switch mode power supply including a diode, the method comprising:
turning on a bypass switch, wherein the turning on of the bypass switch causes the diode to transition into a blocking mode;
detecting if the diode coupled to in an output stage of the switch mode power supply is in a blocking mode; and
upon detecting that the diode is in the blocking mode, turning on a main switch of the power supply and turning off the bypass switch.

10. The method of claim 9, wherein, the power supply is configured to detect that the diode is in the blocking mode using a comparator coupled to the diode and the bypass switch.

11. A power supply, the power supply comprising:
an output diode;
a main switch coupled to an input filter;
an output inductor coupled to the output diode and the main switch;
a bypass switch coupled to the main switch and configured to bypass the output inductor; and
a switch driver configured to turn on the bypass switch, wherein the turning on of the bypass switch causes the output diode to transition into a blocking mode, and upon detecting the output diode in a blocking mode, turn on the main switch, wherein the bypass switch is configured to be turned off automatically when the main switch turns on.

12. The power supply of claim 11, wherein the input filter includes a filter inductor and a filter capacitor.

13. The power supply of claim 11, further including a reference voltage source to regulate an output voltage.

14. The power supply of claim 11, wherein the main switch, the bypass switch and the switch driver are incorporated in a same integrated circuit.

* * * * *